(12) United States Patent
Pinciaro

(10) Patent No.: US 6,761,451 B2  
(45) Date of Patent: Jul. 13, 2004

(54) COLORED/TINTED CONTACT LENS PREVIEW DEVICE

(75) Inventor: Bryan D. Pinciaro, Jacksonville Beach, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 39 days.

(21) Appl. No.: 10/126,418

(22) Filed: Apr. 19, 2002

(65) Prior Publication Data

US 2003/0197832 A1 Oct. 23, 2003

(51) Int. Cl.[7] .................................................. G02C 7/04
(52) U.S. Cl. ..................... 351/162; 351/177; 351/160 R
(58) Field of Search .............................. 351/152, 160 R, 351/160 H, 161, 163, 177, 233, 47; 294/1.1, 1.2

(56) References Cited

U.S. PATENT DOCUMENTS

| | | | |
|---|---|---|---|
| 4,703,964 A | | 11/1987 | Ranani ........................ 294/1.1 |
| 5,585,874 A | * | 12/1996 | Wickes ........................ 351/233 |
| 6,095,650 A | * | 8/2000 | Gao et al. .................... 351/227 |
| 2003/0007123 A1 | * | 1/2003 | Broderick et al. .......... 351/177 |

FOREIGN PATENT DOCUMENTS

WO    WO 02/37170 A    5/2002

OTHER PUBLICATIONS

European Search Report, dated Oct. 30, 2003, for European Appln. 03 25 2447.

* cited by examiner

*Primary Examiner*—Jordan Schwartz
*Assistant Examiner*—Jessica Stultz

(57) ABSTRACT

A colored/tinted contact lens preview device which is a beauty mirror sales aid to enable a prospective purchaser or wearer of colored or tinted contact lenses to preview the appearance of different color or tint paten of contact lenses as they would appear as a colored or contact lens on the eye of the person. The preview device comprises a transparent substrate with a selection of different color or tint circular or annular/toroidal patterns, each of which simulates a contact lens with that particular color or tint pattern. In usage, a person views their eye in a mirror with a particular color or tint pattern of interest superimposed over the eye, such that the preview device simulates the appearance of that particular color or tint contact lens on the eye of the person.

29 Claims, 2 Drawing Sheets

COLORED/TINTED CONTACT LENS PREVIEW DEVICE

BACKGROUND OF THE INVENTION

1. Field of the Invention

The present invention relates generally to a colored/tinted contact lens preview device, and more particularly pertains to a colored/tinted contact lens preview device which is a beauty mirror sales aid to enable a person considering purchasing or wearing colored or tinted contact lenses to preview a particular color or tint pattern as it would appear as a colored or tinted contact lens on the eye of that person.

2. Discussion of the Prior Art

Colored and tinted contact lenses have gained great popularity as a result of the rise in the general acceptance of contact lenses, greater public sensitivity to personal appearance and improved contact lens structures (soft contact lenses, oxygen permeable contact lenses, etc.).

Colored and tinted contact lenses can be of two general categories. The first category includes contact lenses which use essentially transparent enhancement colors and allow the color of the contact lens to augment the natural color of the iris to produce a new appearance. Such tinted lenses might typically be used to turn a hazel eye to an aqua colored eye. This class of colored lenses may not be able to change an underlying dark colored iris to a different color, e.g. a brown iris to blue. The second category includes an opaque class of tinted lenses in which the color of the contact lens masks the natural iris color and presents a new color on the outside of the eye. This class of contact lenses is able to render a brown eye blue, etc.

Presently, persons fitting colored or tinted contact lens, such as ophthalmologists and optometrists, have to assist a patient to repeatedly try different tinted contact lenses by actually inserting, or having the patient insert, each pair into contact with the patient's eyes so that the patient can see the color which results from the combined tint of the contact lens and the patient's natural iris color. And often, previously tried tinted contact lens have to be retried in order for the patient to make a final decision as to which tint to order from the many colors which are offered.

Ranani U.S. Pat. No. 4,703,964 discloses a tinted contact lens preview device and fitter having a scissors type support to vary the spacing between pairs of tinted contact lenses mounted in rotatable discs, or in plug-in lens holders, or directly in openings in the support, so that the centers of the tinted contact lenses can be aligned with the centers of the patient's pupils in order for the patient to view in a mirror the combined color of the tinted contact lenses and the color of the patient's irises.

Each pair of lens holders for each different tint must be prepared separately by placing a tinted contact lens in saline solution in a lens holder and then sealing the lens holder with a closure. Pairs of lens holders, each containing a pair of soft contact lens of the same tint, must be prepared for each different available color.

To allow a patient to view different tints to obtain a desired color, an ophthalmologist or optometrist fitter must place into a lens receptacle different pairs of lens holders containing tinted contact lenses of different tints, and the patient then looks at the resulting colors and makes a decision as to which tint to order.

In another embodiment a pair of discs, each including a plurality of mounted tinted contact lenses, are interchangeably attached to the scissors support so that different colors may be viewed by rotating the discs or by changing the discs. Each disc has three U-shaped openings spaced 120 degrees apart. Each opening is adapted to receive a tinted contact lens in a contact lens holder. If the tinted contact lens is a soft contact lens, it is immersed in a saline solution.

In operation, each of the openings contains a tinted contact lens of a different color, with pairs of discs having matching tints in corresponding openings. First, the patient, with the aid of an ophthalmologist or optometrist fitter, adjusts the angle between the levers of the scissors support so that the center of the contact lens in each of the vertical top openings is aligned with the centers of the patient's pupils. Then the resulting combined color of the tint of the contact lenses and the patient's iris color is examined in a mirror. Then the patient or the fitter rotates the discs together to bring to the vertical top position a different pair of contact lenses having a matching tint, and checks the resulting combined color, until a desired tint is determined. Thus each disc permits the viewing of three different tints. And other pairs of discs, with contacts lenses of stiff different tints, can be substituted for the attached pair of discs.

The Ranani approach requires an expensive instrument which uses actual contact lenses mounted in lens holders, and moreover requires a great deal of time by an ophthalmologist or optometrist fitter during fitting and trial of different color/tint contact lenses. The Ranani approach also requires a somewhat cumbersome and time consuming fitting process which includes placing a pair of colored or tinted contact lenses into the scissors support, aligning the pair of colored or tinted contact lenses with the eyes of the patient to view the appearance, and then removing and replacing the previous pair of colored or tinted contact lenses with another pair of different colored or tinted contact lenses, and then repeating the fitting process for each different color or tint or pattern of interest.

SUMMARY OF THE INVENTION

Accordingly, it is a primary object of the present invention to provide a colored/tinted contact lens preview device as a contact lens beauty mirror sales aid which enables a person considering purchasing or wearing colored or tinted contact lenses to preview a particular color or tint pattern as it would appear as a colored or tinted contact lens on the eye of that person.

The preview device of the present invention substantially reduces the amount of time required by an ophthalmologist or optometrist to fit tinted contact lenses, and thus reduces the fitting cost, and also provides a preview device for fitting tinted contact lenses which is relatively inexpensive to construct and easy to use. More specifically, the preview device of the present invention is sufficiently easy and simple to use and inexpensive that a person in an ophthalmologist's or optometrist's office can preview different color and tint contact lenses without requiring the assistance of the ophthalmologist or optometrist (as in a waiting room).

In accordance with the teachings herein, the present invention provides a colored/tinted contact lens preview device which is a beauty mirror sales aid to enable a prospective purchaser or wearer of colored or tinted contact lenses to preview the appearance of different color or tint patterns of contact lenses as they would appear as a colored or contact lens on the eye of the person. The preview device comprises a transparent substrate with a selection of different color or tint circular or annular/toroidal patterns, each of which simulates a contact lens with that particular color or tint pattern. In usage, a person views their eye in a mirror with a particular color or tint pattern of interest superimposed over the eye, such that the preview device simulates the appearance of that particular color or tint contact lens on the eye of the person.

BRIEF DESCRIPTION OF THE DRAWINGS

The foregoing objects and advantages of the present invention for a colored/tinted. contact lens preview device may be more readily understood by one skilled in the art with reference being had to the following detailed description of several embodiments thereof taken in conjunction with the accompanying drawings wherein like elements are designated by identical reference numerals throughout the several views, and in which.

DETAILED DESCRIPTION OF THE INVENTION

The colored/tinted contact lens preview device of the present invention enables a prospective purchaser or wearer of colored or tinted contact lenses to preview the appearance of different color or tint patterns of contact lenses as they would appear as a colored or tinted contact lens on the eye of the person. The preview device comprises a transparent substrate with a selection of different color or tint circular or annular/toroidal patterns, each of which simulates a contact lens with that particular color or tint pattern. In usage, a person views their eye in a mirror with a particular color or tint pattern of interest superimposed over the eye, such that the preview device simulates the appearance of that particular color or tint contact lens on the eye of the person.

Several different embodiments on a colored/tinted contact lens preview device are disclosed and illustrated herein.

Figure 1:
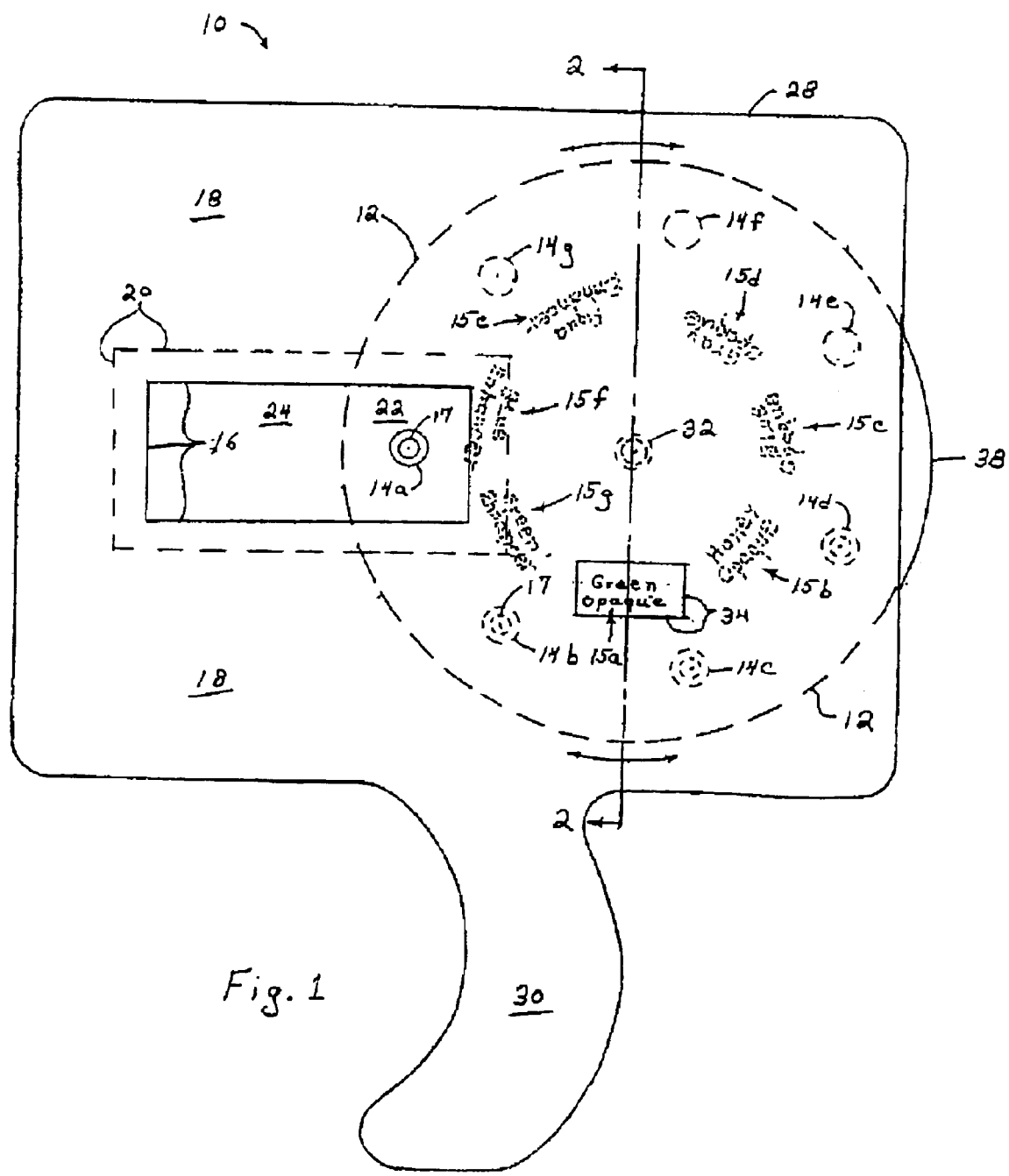
FIG. 1 illustrates a first preferred embodiment of the preview device of the present invention.
Figure 2:
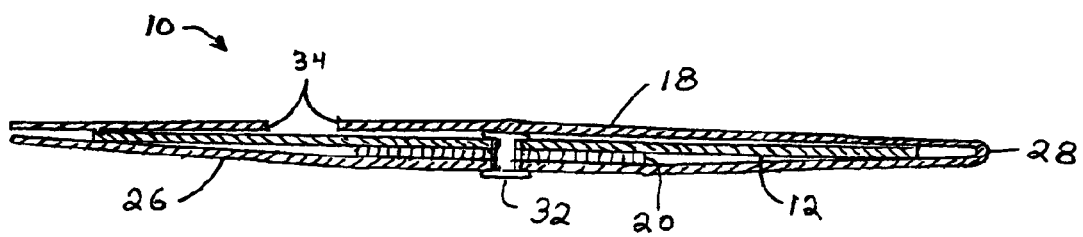
FIG. 2 is a sectional view through the preview device of FIG. 1 taken along arrows 2—2 in FIG. 1.

FIGS. 1 and 2 illustrate a first preferred embodiment of the preview device of the present invention wherein FIG. 1 is a front plan view of the preview device 10, and FIG. 2 is a sectional view through the preview device 10 taken along arrows 2—2 in FIG. 1. The preview device 10 comprises a rotatably mounted, disc shaped, transparent substrate 12 which has a plurality of different color or tint circular or annular/toroidal, contact lens simulating patterns 14a, 14b, 14c, 14d, 14e, 14f and 14g printed thereon so as to be periodically spaced around its circumference. In one designed embodiment, the transparent disc substrate 12 is formed of BX 188 Pentaclear vinyl film having printed thereon color contact lens simulating patterns to showcase each of 7 different color or tint contact lens patterns with their respective opaque and enhancer names on a 4" diameter, 0.012" thick uncoated disc. Pentaclear BX 188 is commercially available from Klockner Pentaplast of America, Inc. and is a rigid homopolymer vinyl film with very high impact strength which provides excellent cosmetic, clarity and high gloss qualities.

The plurality of different color or tint contact lens simulating patterns 14 can include any selected combination of colors and tints and patterns. One disclosed plurality of patterns includes an annular/toroidal shaped green opaque pattern 14a, an annular/toroidal shaped honey opaque pattern 14b, an annular/toroidal shaped blue opaque pattern 14c, an annular/toroidal shaped gray opaque pattern 14d, a circular shaped aqua enhancer pattern 14e, a circular shaped blue enhancer pattern 14f and a circular shaped green enhancer pattern 14g. In general, the enhancer patterns 14e, 14f and 14g are presented as circularly shaped, lightly colored patterns, while the opaque patterns 14a, 14b, 14c and 14d are presented as annular/toroidal shaped darker colored patterns with a transparent central circular opening 17 through which light can pass to the retina of the eye.

A rectangular shaped viewing aperture 16 is formed in the front side 18 of the preview housing, such that any one of the plurality of circumferentially spaced different color or tint contact lens simulating patterns 14 can be selectively rotated into an operative preview position in the viewing aperture 16 formed in the front side 18 of the preview device, with a Green opaque pattern 14a being shown in the viewing aperture in FIG. 1. A mirror 20 is also positioned in the viewing aperture 16, behind the transparent rotatable disc 12 at 22, and to one side of the transparent rotatable disc 12 at 24, such that a person can rotate the disc to selectively position a color or tint pattern of interest in the viewing aperture, and can then preview in the mirror 20 the appearance of that particular color or tint pattern contact lens on the eye of the person.

A second identification aperture 34 can also be formed in the front side 18 of the preview housing, through which the previewing person can identify the color and name 15 of the particular pattern being previewed, e.g. green opaque identifier printing 15a being associated with the annular/toroidal shaped green opaque pattern 14a, and etc. for 15b–14b, 15c–14c, 15d–14d, 15e–14e, 15f–14f and 15g–14g. The identifier printings 15 are also printed on the rotatable disc 12 such as to be visible through the identification aperture when the named pattern is properly positioned in the viewing aperture, such that the identifier printings 15 are printed on the rotatable disc with different angular orientations as shown in FIG. 1.

In a preferred embodiment, the preview housing is formed of a stiff paperboard or plastic preview housing which substantially encloses most of the disc. However, one edge 36 of the disc extends beyond one edge 38 of the preview housing such that the disc can be easily selectively manually rotated.

The preview device housing can be simply formed of a single stamped piece of stiff paperboard having symmetrically shaped front 18 and rear 26 sides, which are folded 180° at the upper edge 28 of the preview device housing, such that one half forms the front side 18 of the preview housing and the second half forms the rear side 26 of the preview housing. The preview housing preferably includes a downwardly extending handle 30 for ease of handling and usage. The front and rear sides can be secured together by a suitable adhesive at a lower portion of housing, such as at the lower handle portion 30. The rotatable disc is suitably mounted for rotation between the front and rear sides of the previewer housing, as by a simple metal rivot eyelet or pin 32 passing through the center of the rotatable disc 12 and also through the rear side 26 of the previewer housing.

Decorative or advertising printing, such as colored logos and trademarks, and/or instructions for usage of the previewer device can be printed upon either or both of the front and back surfaces of the previewer housing.

The embodiment of FIGS. 1 and 2 functions well when the previewer device and mirror are positioned approximately 12–18 inches in front of a face, such that both eyes can be seen in the mirror, and is designed for placement of the color or tint contact lens simulating patterns over the right eye which is the dominant eye in most people.

In one designed embodiment, the hand held paperboard sleeve presents a 6 1/16" wide by 4 11/16" high rectangular body which is 7 3/8" high including the handle (folded size), and is formed of diecut 0.024" SBS coated paperboard printed with trademarks, logos and instructions by a four color process. The viewing aperture is 2 3/16" wide and 1" high, and the identification aperture is 13/16 wide and 9/16 high. A 3"×1 1/2" acrylic mirror is mounted via adhesive inside the sleeve as seen on window side to reflect the user's eyes from a distance of 12–18." The sleeve is spot glued after folding to close in appropriate locations.

Figure 3:
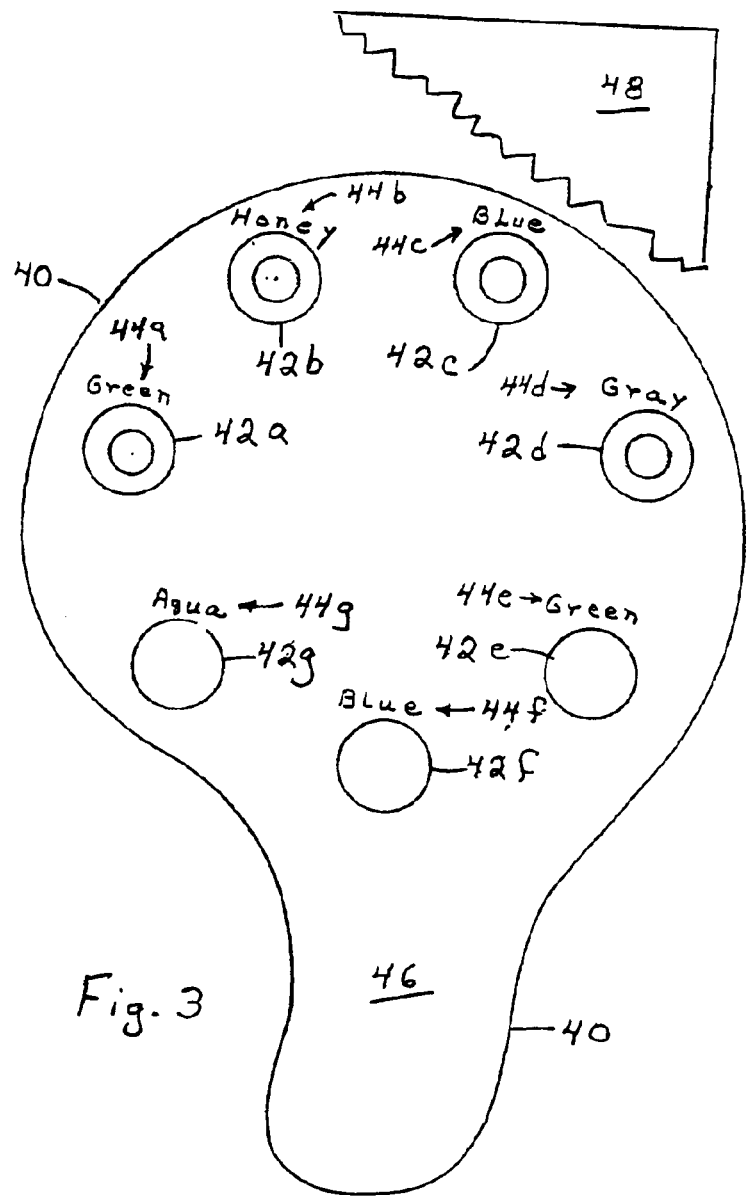
FIG. 3 illustrates a second more basic embodiment of the present invention which comprises only a transparent substrate preview device.

FIG. 3 illustrates a second more basic embodiment of the present invention which comprises only a transparent substrate preview device 40 having a plurality of different color or tint contact lens simulating patterns 42a–42g printed thereon with associated identifier legends 44a–44g at different positions on the transparent substrate, wherein the color or tint contact lens simulating patterns 42a–42g are generally larger than the corresponding patterns 14a–14g of the embodiment of FIGS. 1 and 2. The preview housing preferably includes a downwardly extending handle 46 for ease of handling and usage. In usage, a previewing person holds the transparent substrate in front of a selected eye such that a selected color or tint contact lens simulating pattern of interest is positioned in front of the eye while the person is spaced a suitable distance (e.g. 1–3 feet) from an external mirror 48. The arrangement is such that the person can view the appearance of a particular selected color or tint contact lens pattern of interest 42 on the eye, and by moving the preview device slightly can compare the appearance of the person's natural eye color with the selected color or tint contact lens simulating pattern The previewing person can also selectively move the preview device to position any one of the plurality of different color or tint contact lens simulating patterns 42a–42g in front of the eye to compare and evaluate each different contact lens simulating pattern in turn.

While several embodiments and variations of the present invention for a colored/tinted contact lens preview device are described in detail herein, it should be apparent that the disclosure and teachings of the present invention will suggest many alternative designs to those skilled in the art.

I claim:

1. A contact lens preview device which enables a prospective wearer of colored or tinted contact lenses to preview the appearance of different color or tint patterns of contact lenses as they would appear as a colored or tinted contact lens on the eye of the person, comprising a transparent substrate having a selection of different color or tint contact lens simulating patterns thereon, each of which simulates a contact lens with that particular color or tint pattern, such that when a person views their eye in a mirror with a particular color or tint pattern of interest superimposed over the eye, the preview device simulates the appearance of that particular color or tint contact lens on the eye of the person.

2. The preview device of claim 1, wherein the transparent substrate comprises a rotatably mounted disc which has a plurality of different color or tint contact lens simulating patterns circumferentially spaced around the circumference of the disc.

3. The preview device of claim 2 wherein the preview device comprises a preview housing having a front side and a rear side, and the transparent substrate disc is rotatably mounted between the front side and the rear side of the preview housing.

4. The preview device of claim 3 wherein a viewing aperture is formed in the front side of the preview housing, such that any one of the plurality of circumferentially spaced different color or tint contact lens simulating patterns can be selectively rotated into a preview position in the viewing aperture.

5. The preview device of claim 4 wherein a mirror is positioned in the viewing aperture behind the transparent substrate disc, such that a person can rotate the transparent substrate disc to selectively position a color or tint pattern of interest in the viewing aperture, and can then preview in the mirror the appearance of that particular color or tint pattern contact lens on the eye of the person.

6. The preview device of claim 5, wherein the mirror is positioned in the viewing aperture behind the substrate disc and also to one circumferential side of the transparent substrate disc.

7. The preview device of claim 4, wherein an identifying aperture is formed in the front side of the preview housing, through which a previewing person can identify by an identifier printed legend the color and name of a particular pattern being previewed in the viewing aperture, and the identifier printed legends are printed on the rotatable substrate disc such as to be visible through the identifying aperture when the named pattern is positioned in the viewing aperture.

8. The preview device of claim 7, wherein the identifier printed legends are printed on the rotatable substrate disc with different angular orientations, such that as the rotatable substrate disc is rotated, the identifier printed legends are visible in an upright position through the identifying aperture when the pattern associated therewith is positioned in the viewing aperture.

9. The preview device of claim 3, wherein the preview housing is formed of a single stamped piece of material having symmetrically shaped front and rear sides, which are folded 180° at an upper edge of the preview device housing, such that one half of the piece of material forms the front side of the preview housing and the second half of the piece of material forms the rear side of the preview housing.

10. The preview device of claim 3, wherein the preview housing is formed of a single stamped piece of paperboard having symmetrically shaped front and rear sides, which are folded 180° at an upper edge of the preview device housing, such that one half of the piece of paperboard forms the front side of the preview housing and the second half of the piece of paperboard forms the rear side of the preview housing.

11. The preview device of claim 3, wherein the rotatable substrate disc is mounted for rotation between the front and rear sides of the preview housing by a rivet eyelet which passes through the center of the rotatable substrate disc and also through the rear side of the preview housing.

12. The preview device of claim 3, wherein the rotatable substrate disc is mounted for rotation between the front and rear sides of the preview housing by a pin which passes through the center of the rotatable substrate disc and also through the preview housing.

13. The preview device of claim 3, wherein the preview housing includes a lower downwardly extending handle provided for ease of handling and usage.

14. The preview device of claim 13, wherein the front and rear sides are secured together at the lower downwardly extending handle.

15. The preview device of claim 3, wherein one edge of the disc extends beyond the preview housing such that the disc can be selectively manually rotated.

16. The preview device of claim 1, wherein the plurality of different color or tint contact lens simulating patterns includes both circular shaped patterns and annular or toroidal shaped patterns.

17. The preview device of claim 1, wherein the plurality of different color or tint contact lens simulating patterns includes annular or toroidal shaped, darkly colored opaque patterns, and circular shaped, lightly colored enhancer patterns.

18. preview device of claim 15, wherein the plurality of different color or tint contact lens simulating patterns includes an annular or toroidal shaped green opaque pattern, an annular or toroidal shaped honey opaque pattern, an annular or toroidal shaped blue opaque pattern, an annular or toroidal shaped gray opaque pattern, a circular shaped aqua enhancer pattern, a circular shaped blue enhancer pattern, and a circular shaped green enhancer pattern.

19. The preview device of claim 1, which comprises a transparent substrate preview device having a plurality of different color or tint contact lens simulating patterns printed thereon with associated identifier legends at different positions on the transparent substrate, such that a previewing person holds the transparent substrate in front of a selected eye such that a selected color or tint contact lens simulating pattern of interest is positioned in front of the eye while the person is paced a distance from an external mirror, such that a person can view the appearance of a particular selected color or tint contact lens pattern of interest on the eye, and by moving the preview device slightly can compare the appearance of the person's natural eye color with the selected color to tint contact lens simulating pattern, and the previewing person can also selectively move the preview device to a position any one of the plurality of different color or tint contact lens simulating patterns in front of the eye to compare and evaluate each different contact lens simulating pattern in turn.

20. The preview device of claim 1, wherein the selection of different color or tint contact lens simulating patterns are printed on the transparent substrate.

21. A contact lens preview device which enables a prospective wearer of colored or tinted contact lenses to preview the appearance of different color or tint patterns of contact lenses as they would appear as a colored or tinted contact lens on the eye of the person, the preview device comprising:
a preview housing comprising a front side including a first aperture and a second aperture; and
a substrate movably positioned behind the preview housing front side, the substrate comprising a selection of different color or tint contact lens simulating patterns disposed on the substrate, and an identifier legend associated with each of the different color or tint contact lens simulating patterns disposed on the substrate;
wherein the substrate is movable such that one of the different color or tint contact lens simulating patterns is viewable through the first aperture and the associated identifier legend is viewable through the second aperture.

22. The preview device of claim 21, wherein the substrate is transparent and the selection of different color or tint contact lens simulating patterns are printed on the substrate.

23. The preview device of claim 21, wherein a mirror is disposed behind the substrate and is viewable through the first aperture.

24. The preview device of claim 21, wherein the preview housing further comprises a lower downwardly extending handle provided for ease of handling and usage.

25. The preview device of claim 21, wherein the preview housing is formed of a single stamped piece of material that is folded such that one folded portion forms the front side of the preview housing.

26. A contact lens preview device which enables a prospective wearer of colored or tinted contact lenses to preview the appearance of different color or tint patterns of contact lenses as they would appear as a colored or tinted contact lens on the eye of the person, the preview device comprising:
a preview housing comprising a front side including an aperture formed therein;
a substrate movably positioned behind the preview housing front side, the substrate at least partially viewable through the aperture and comprising a selection of different color or tint contact lens simulating patterns disposed on the substrate; and
a mirror disposed behind the substrate and viewable through the aperture.

27. The preview device of claim 26, wherein substrate is transparent and the selection of different color or tint contact lens simulating patterns are printed on the substrate.

28. A contact lens preview device which enables a prospective wearer of colored or tinted contact lenses to preview the appearance of different color or tint patterns of contact lenses as they would appear as a colored or tinted contact lens on the eye of the person, the preview device comprising:
comprising a transparent substrate including a selection of different color or tint contact lens simulating patterns printed thereon; and
a handle extending from the transparent substrate for manipulating the transparent substrate such that one of the different color or tint contact lens simulating patterns is in-line with an eye of the perspective wearer whereby the perspective wearer can view the appearance of a particular selected color or tint contact lens pattern of interest on the eye.

29. The preview device of claim 28, wherein the transparent substrate further includes an identifier legend printed thereon that is associated with each of the different color or tint contact lens simulating patterns.

* * * * *